United States Patent [19]

Kuo et al.

[11] Patent Number: 5,307,515
[45] Date of Patent: Apr. 26, 1994

[54] ADJACENT CHANNEL CONTROLLER FOR RADIO RECEIVER

[75] Inventors: Yao H. Kuo, Canton; John F. Kennedy, Garden City, both of Mich.

[73] Assignee: Ford Motor Company, Dearborn, Mich.

[21] Appl. No.: 740,172

[22] Filed: Aug. 5, 1991

[51] Int. Cl.[5] .............................................. H04B 1/14
[52] U.S. Cl. ........................................ 455/295; 455/307; 455/313; 455/258; 333/17.1
[58] Field of Search ............ 455/296, 295, 266, 265, 455/258, 254, 243.1, 302, 307, 310, 311, 313, 303; 333/101, 17.1, 126, 129, 132

[56] References Cited

U.S. PATENT DOCUMENTS

| | | | |
|---|---|---|---|
| 2,923,814 | 2/1960 | Smith-Vaniz, Jr. | 455/307 |
| 4,124,817 | 11/1978 | Takahashi | 455/177 |
| 4,192,970 | 3/1980 | Kahn | 455/311 |
| 4,206,317 | 6/1980 | Kahn | 455/311 |
| 4,352,208 | 9/1982 | Schroeder | 455/266 |
| 4,356,567 | 10/1982 | Eguchi et al. | 455/177 |
| 4,388,731 | 6/1983 | King | 455/303 |
| 4,907,293 | 3/1990 | Ueno | 455/295 |

Primary Examiner—Reinhard J. Eisenzopf
Assistant Examiner—Mark D. Wisler
Attorney, Agent, or Firm—Mark Mollon; Roger L. May

[57] ABSTRACT

The radio receiver of the present invention detects the presence of adjacent channel interference in either the lower adjacent channel or the upper adjacent channel and shifts the received signals to remove the adjacent channel interference from the intermediate frequency passband, but only if the other adjacent channel is clear. A maximum amount of the desired signal is retained so that modulation distortion is low. Frequency limits for shifting of the desired signals prevent undesirable amounts of phase distortion from being introduced into the audio signal.

16 Claims, 3 Drawing Sheets

ADJACENT CHANNEL CONTROLLER FOR RADIO RECEIVER

This application is related to commonly assigned applications Ser. No. 07/740,240, entitled "AUTOMATIC GAIN CONTROL FOR RF AMPLIFIER", and Ser. No. 07/740,243, now U.S. Pat. No. 5,222,255, entitled "INTERMODULATION CONTROLLER FOR RADIO RECEIVER", filed concurrently herewith and incorporated herein by reference.

BACKGROUND OF THE INVENTION

The present invention relates in general to detecting and reducing adjacent channel interference in a radio receiver, and more specifically to determining the presence of an upper adjacent channel or a lower adjacent channel and shifting the frequency of a mixing signal to reduce adjacent channel interference.

It is well known that the commercial AM and FM broadcast bands include a plurality of evenly spaced channels. A particular broadcast station is allocated a channel for broadcast within an assigned frequency range.

The power spectrum of a transmission depends on the energy content of a radiated signal at each frequency. Even though most energy in a transmission can be limited to its assigned channel, efficient use of all the channels implies that some radiated energy will be at frequencies outside the assigned channel.

Assignment of broadcast channels to transmitters is determined according to geographic location and other factors to minimize interference between tranmissions in adjacent channels. However, demand in populous areas is high for the limited number of channels. A radio receiver must therefore cope with the situation where a strong signal on an adjacent channel creates signal components in the desired channel which interfere with reception of the desired signal. Interference has been found to be objectionable when the total power in the adjacent channel signal is about 30dB greater than the total power in the desired channel signal.

Some prior art radio receivers have detected the presence of an objectionable adjacent channel signal by various methods including: separately tuning each channel and measuring its signal strength; detecting beat components caused by an adjacent channel in the desired channel; or detecting the difference in signal levels of a narrowband portion of the desired signal and the full wideband signal in the desired channel. If no adjacent channel signals are found in the prior art receivers, then a wideband intermediate frequency (IF) filter is used to give the maximum signal quality to the desired signal. If an adjacent channel signal is found, then a narrowband IF filter is switched into the signal path to eliminate adjacent channel interference at the expense of introducing modulation distortion which reduces the desired signal quality. The prior art also teaches a receiver wherein narrowband and wideband IF signals are blended together in accordance with the relative strength of the adjacent channel signals so that switching between the narrowband and wideband IF signals is not noticeable. However, modulation distortion is still introduced.

SUMMARY OF THE INVENTION

It is a principal object of the present invention to provide a radio receiver with less susceptability to adjacent channel interference.

It is another object of the present invention to provide method and apparatus for removing adjacent channel interference while introducing a reduced amount of modulation distortion.

It is another object of the present invention to detect the presence of adjacent channel interference with few added components and without retuning the receiver.

It is a further object of the present invention to detect which adjacent channel, i.e., the lower or upper adjacent channel, is present at a strength sufficient to cause adjacent channel interference.

These and other objects are achieved using an adjacent channel detector having a tri-band filter for filtering the IF signals to derive a lower channel signal, a desired channel signal, and an upper channel signal. The signal levels of the three channels are compared. If one of the adjacent channels has a signal level greater than that of the desired channel by a first predetermined proportion and the other adjacent channel has a signal level less than that of the desired channel level by a second predetermined proportion, then adjacent channel interference is detected from the one adjacent channel. If adjacent channel interference is detected, then the frequency of a mixing signal in an IF mixer is shifted in a manner to move the interfering frequencies of the adjacent channel signal out of the IF passband. Adjacent channel interference is substantially eliminated, yet the level of modulation distortion introduced is only half the modulation distortion that would otherwise be introduced by narrowing the IF bandwidth since the IF passband remains fixed in the present invention.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION OF PREFERRED EMBODIMENTS

Figure 1:
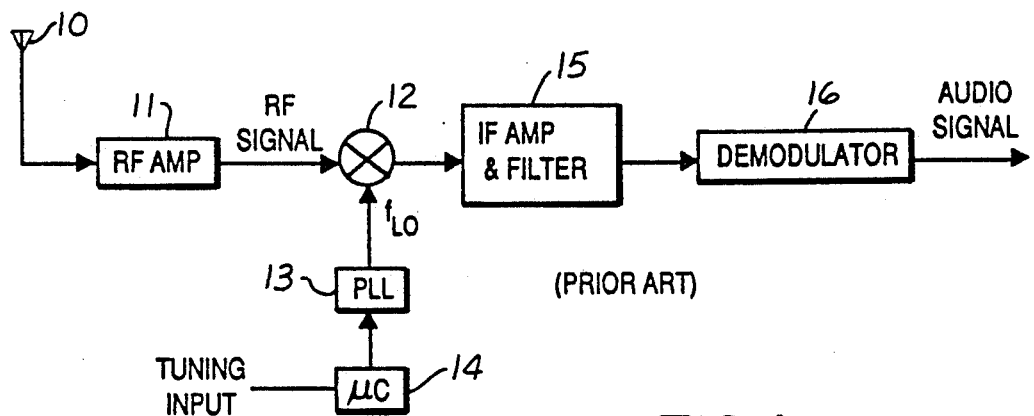
FIG. 1 is a block diagram showing a prior art radio receiver.

In FIG. 1, a conventional receiver includes an antenna 10 connected to a radio frequency (RF) amplifier 11. An RF signal is output from RF amplifier 11 and mixed in a mixer 12 with a mixing signal $f_{LO}$ from a phase-locked loop local oscillator 13. The frequency of mixing signal $f_{LO}$ is controlled by a microcontroller 14, in response to an external tuning input, and frequency-shifts a desired RF signal from RF amplifier 11 to the intermediate frequency (IF) of the receiver. The IF signal from mixer 12 is fed to an IF amplifier and filter 15. The amplified and filtered IF signal is then fed to a demodulator 16 which separates the audio signal from the IF and outputs an audio signal.

Figure 2:
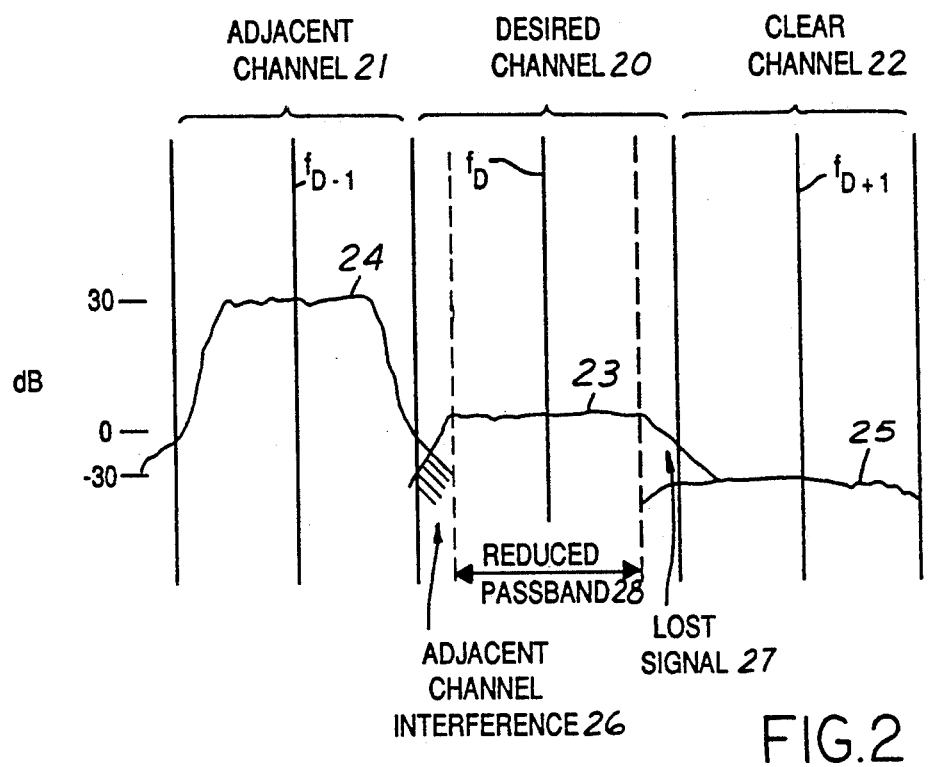
FIG. 2 plots power spectra for adjacent channels and shows the resulting adjacent channel interference.

FIG. 2 shows an example of power spectra that give rise to adjacent channel interference. A desired channel 20 includes a broadcast transmission signal 23 to be received by the radio receiver. Transmitted signal 23 has a center frequency $f_D$ and has a transmitted power spectrum as shown. In lower adjacent channel 21, a transmitted signal 24 has a center frequency $f_{D-1}$ and has a total power in its power spectrum of 30 dB or more referenced to the power of transmitted signal 23. An upper adjacent channel 22, having a center frequency $f_{D+1}$, is a clear channel, i.e., its power spectra 25 is about 30 dB less than the power of transmitted signal 23.

As a consequence of the greater transmitted power in transmitted signal 24, an adjacent channel interference 26 results within desired channel 20. Interference was removed in prior art receivers by employing a reduced passband 28. By reducing the bandwidth of the received signal, adjacent channel interference 26 is removed. However, a lost signal portion 27 results which does not contain interference. Modulation distortion is introduced into the received signal by elimination of the upper and lower frequency portions of the desired transmitted signal 23. The Present invention reduces modulation distortion by restoring the lost signal portion 27.

Figure 3:
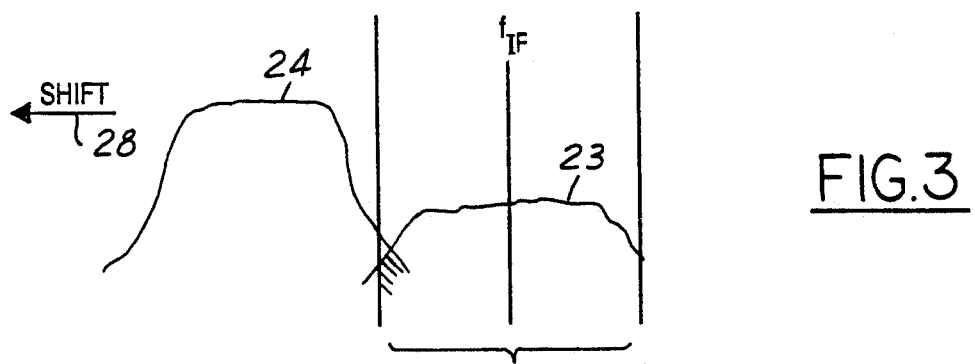
FIG. 3 shows the unmodified relationship between the power spectra and a fixed IF passband.
Figure 4:
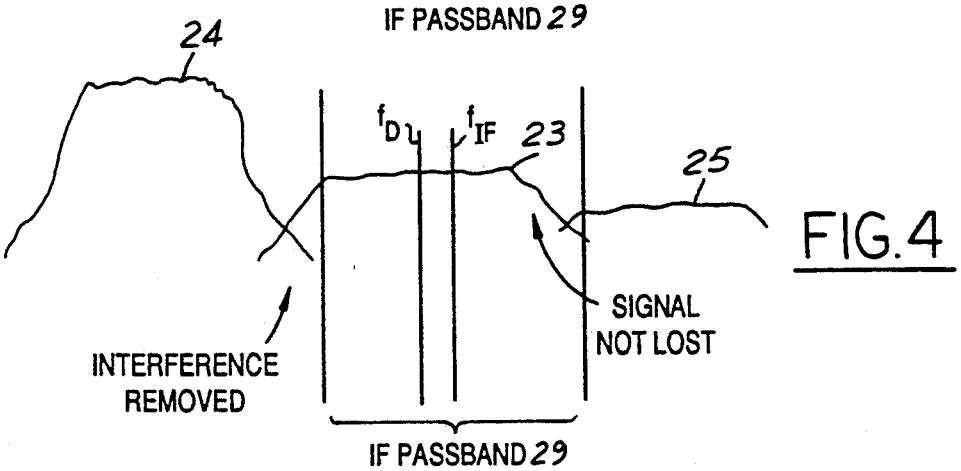
FIG. 4 shows the relationship between the power spectra and the IF passband after shifting of the IF signals to remove interference.

As shown in FIG. 3, the present invention employs a fixed IF passband 29 having a fixed center IF frequency $f_{IF}$. After the RF signals are mixed to the IF frequency, desired signal 23 is centered on IF passband 29 while most of adjacent channel signal 24 is outside IF passband 29. However, an interfering signal such as shown in FIG. 2 would remain within IF passband 29 caused by adjacent channel signal 24. In order to remove this lower channel interference, the received signals are effectively shifted downward as shown by arrow 28. As shown in FIG. 4, the adjacent channel interference is shifted to frequencies outside the IF passband 29. This also results in the center frequency $f_D$ of desired signal 23 being shifted from the IF frequency $f_{IF}$. However, the interference-free signal which was lost in the prior art by employing a reduced passband is not lost in FIG. 4. In this example, since signal 25 is nonexistent or at a reduced level with respect to the desired signal 23, no new adjacent channel interference is introduced. Thus, adjacent channel interference is removed while only one-half the amount of modulation distortion is introduced as compared to the prior art. The frequency difference between $f_D$ and $f_{IF}$ leads to the introduction of phase distortion, but the phase distortion is less objectionable than the adjacent channel interference which was removed and is less objectionable than the modulation distortion provided that the frequency difference between $f_D$ and $f_{IF}$ is maintained within limits.

Figure 5:
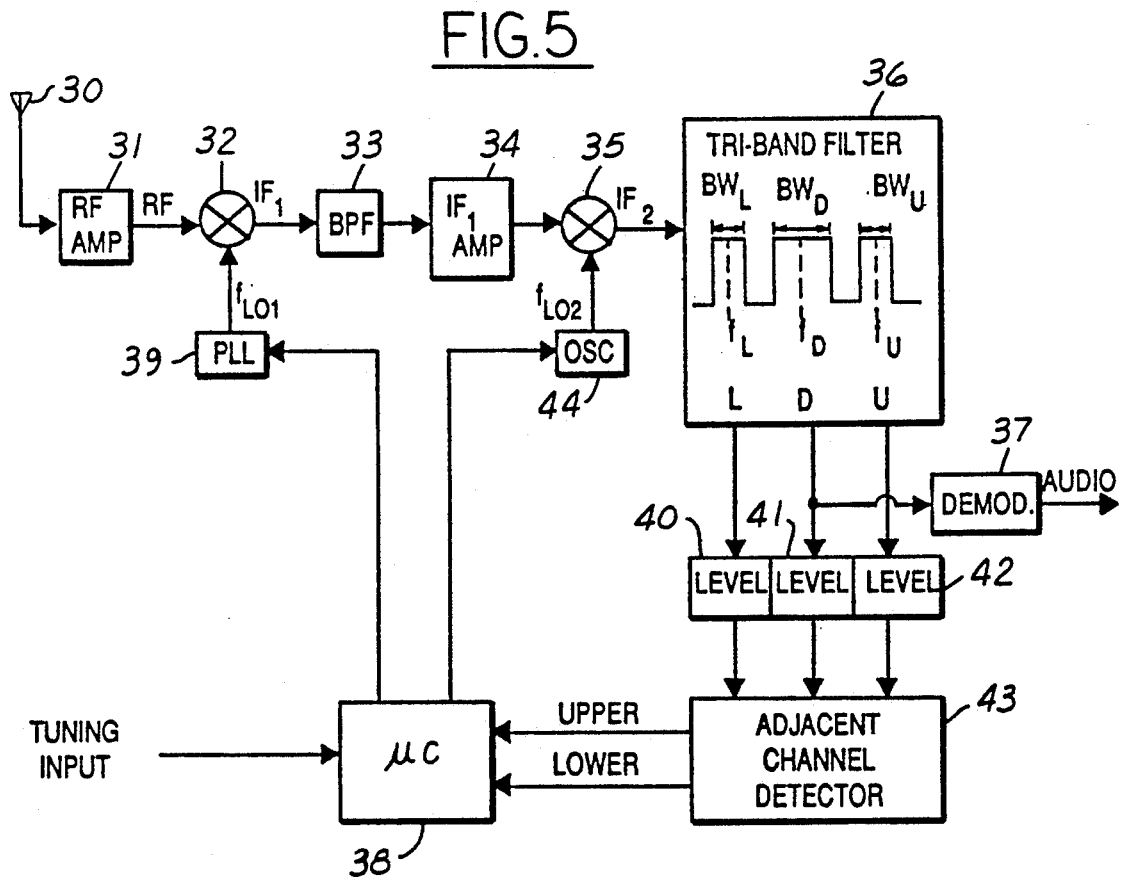
FIG. 5 is a block diagram of a radio receiver constructed according to the present invention.

Turning now to FIG. 5, the improved receiver of the present invention includes a receiving antenna 30 connected to an RF amplifier 31 for providing an RF signal to a mixer 32. A first intermediate frequency signal $IF_1$ is generated by mixer 32 and is input to a bandpass filter 33 and a first $IF_1$ amplifier 34. The first IF signal is mixed in a mixer 35 to generate a second intermediate frequency signal $IF_2$ which is input to a tri-band filter 36. Tri-band filter 36 has three separate passbands to form a desired channel signal D, a lower channel signal L, and an upper channel signal U. Desired channel signal D is provided to an audio demodulator 37 and a level detector 41. Lower channel signal L and upper channel signal U are provided to level detectors 40 and 42, respectively. The outputs of level detectors 40-42 are connected to an adjacent channel detector 43. An upper channel detection signal and a lower channel detection signal can be provided from adjacent channel detector 43 to a microcontroller 38 which is also responsive to a tuning input and which controls mixing frequencies $f_{LO1}$ and $f_{LO2}$ via its interconnections to phase locked loop synthesizer 39 and oscillator 44.

The receiver shown in FIG. 5 is known as a double frequency-conversion superheterodyne receiver. First intermediate frequency $IF_1$ is Preferably located at a conventional IF frequency of about 10.7 MHz in order to provide image rejection as is known in the art. Second intermediate frequency $IF_2$ is selected at about 2 MHz or less, whereby tri-band filter 36 can be constructed with inexpensive components to provide the separate passbands employed by the invention. Furthermore, the bandwidths of bandpass filter 33 and IF amplifier 34 are sufficiently large to include adjacent channel signals on either side of the desired signal.

A center passband of tri-band filter 36 corresponds to desired signal D (located at the second intermediate frequency $IF_2$ after mixing) and has a bandwidth $BW_D$ of about 150 kHz for an FM receiver so as to include all the desired channel signals. Lower adjacent channel signal L is isolated by the lower passband which is centered on a frequency $f_L$ within the lower adjacent channel frequency range. The lower passband has a bandwidth $BW_L$ of from about 5 kHz to about 20 kHz. Center frequency $f_L$ is preferably at the upper end of the frequency range of the lower adjacent channel. In a preferred embodiment, $f_L$ may be about 112 kHz less than $IF_2$. Upper adjacent channel signal L is isolated by an upper passband having a center frequency $f_U$ and a bandwidth $BW_U$ and located symmetrically about frequency $IF_2$ with the lower adjacent channel passband.

Level detectors 40-42 determine the signal strength level of each tri-band filter output and provide the level information to adjacent channel detector 43. The level of desired channel signal D is compared (taking into account the reduced bandwidth of the upper and lower adjacent channel passbands leading to partial power spectra) with the lower channel signal level and the upper channel signal level to test both the lower adjacent channel and the upper adjacent channel for the presence of an adjacent channel signal and for a clear channel. A LOWER ADJACENT CHANNEL DETECTED signal is generated when the ratio of the lower channel level to the desired channel level is greater than a first ratio indicating an interfering station at the lower adjacent channel and the ratio of the upper channel level to the desired channel level is less than a second ratio to indicate a clear channel at the upper adjacent channel. An UPPER ADJACENT CHANNEL DETECTED signal is generated when the ratio of the upper channel level to the desired channel level is greater than the first ratio indicating an interfering station at the upper adjacent channel and the ratio of the lower channel level to the desired channel level is less than the second ratio indicating a clear channel at the lower adjacent channel.

Microcontroller 38 controls the tuning of the receiver at the first intermediate frequency $IF_1$ by commanding phase-locked loop synthesizer 39 to generate a mixing signal $f_{LO1}$ in response to a manual tuning input as is known in the art. In addition, microcontroller 38 adjusts the frequency of oscillator 44 to vary the second mixing signal $f_{LO2}$ in accordance with signals received from adjacent channel detector 43. For example, when the UPPER ADJACENT CHANNEL DETECTED signal is provided from adjacent channel detector 43 to microcontroller 38 indicating that the upper adjacent channel is creating interference and that the lower adjacent channel is clear, microcontroller 38 modifies mixing frequency $f_{LO2}$ to shift the received signals up in frequency.

The mixing frequency $f_{LO2}$ can selectably be either above or below the frequency of the signal with which it is being mixed (i.e., $IF_2$). If a mixing frequency $f_{LO2}$ which is less than $IF_1$ is used in the receiver, then shifting the received signals up in frequency requires decreasing the mixing signal frequency $f_{LO2}$. If a mixing frequency $f_{LO2}$ greater than $IF_1$ is used, then $f_{LO2}$ is increased to shift the received signals up in frequency.

In a similar manner, the received signals are shifted down in frequency in response to the LOWER ADJACENT CHANNEL DETECTED signal.

Oscillator 44 may preferably Comprise a crystal oscillator including capacitive loads which can be selectively switched across the oscillator by micro-controller 38 in order to obtain the variable frequency for mixing signal $f_{LO2}$. Alternatively, oscillator 44 may comprise a fixed oscillator and the frequency shifting of the received signals can be obtained by additionally controlling phase-locked loop 39.

Figure 6:
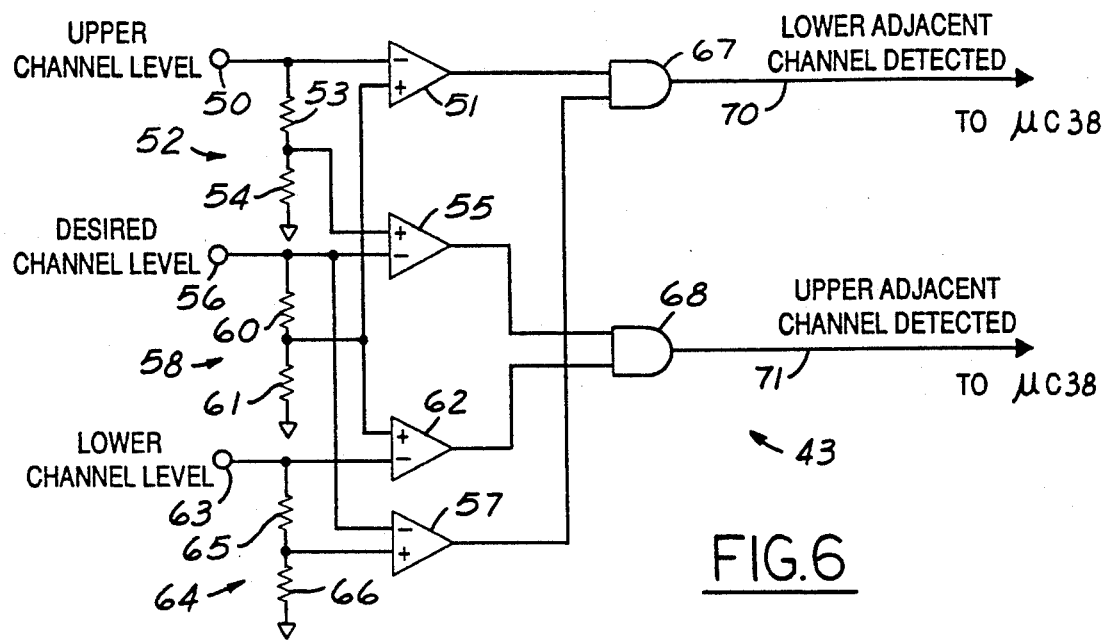
FIG. 6 is a schematic diagram showing the adjacent channel detector of FIG. 5 in greater detail.

Adjacent channel detector 43 is shown in greater detail in FIG. 6. The upper channel level U is input at a terminal 50 to the inverting input of a comparator 51 and to a voltage divider 52 including series connected resistors 53 and 54. The junction of resistors 53 and 54 is connected to the noninverting input of a comparator 55.

The desired channel level signal D is input at a terminal 56 connected to the inverting input of comparator 55, the inverting input of a comparator 57, and a voltage divider 58 including series connected resistors 60 and 61. The junction of resistors 60 and 61 is connected to the noninverting input of comparator 51 and the noninverting input of comparator 62.

The lower channel level signal L is input at a terminal 63 connected to the inverting input of comparator 62 and a voltage divider 64 including series connected resistors 65 and 66. The junction of resistors 65 and 66 is connected to the noninverting input of comparator 57.

The output of comparator 51 is connected to one input of an AND gate 67. The other input of AND gate 67 is connected to the output of comparator 57. The output of AND gate 67 provides the LOWER ADJACENT CHANNEL DETECTED signal which is provided on a line 70 to micro-controller 38.

The output of comparator 55 is connected to one input of an AND gate 68. The other input of AND gate 68 is connected to the output of comparator 62. The output of AND gate 68 provides the UPPER ADJACENT CHANNEL DETECTED signal and is provided on a line 71 to micro-controller 38.

In operation, comparator 51 compares the upper channel level with a portion of the desired channel level as determined by voltage divider 58. Thus, the output voltage from comparator 51 is high when the ratio of the desired channel level to the upper channel level is greater than a predetermined ratio and is low otherwise. Comparator 57 compares the desired channel level with a portion of the lower channel level. Thus, the output voltage of comparator 57 is high when the ratio of the lower channel level to the desired channel level is greater than a predetermined ratio. Thus, the output of AND gate 67 (and thus the LOWER ADJACENT CHANNEL DETECTED signal) is high only when both the lower channel level is bigger than the desired channel level by a first predetermined ratio and the desired channel level is greater than the upper channel level by a second predetermined ratio. The predetermined ratios may both be about 30 dB in the preferred embodiment. The UPPER ADJACENT CHANNEL DETECTED signal is formed in a similar manner.

Figure 7:
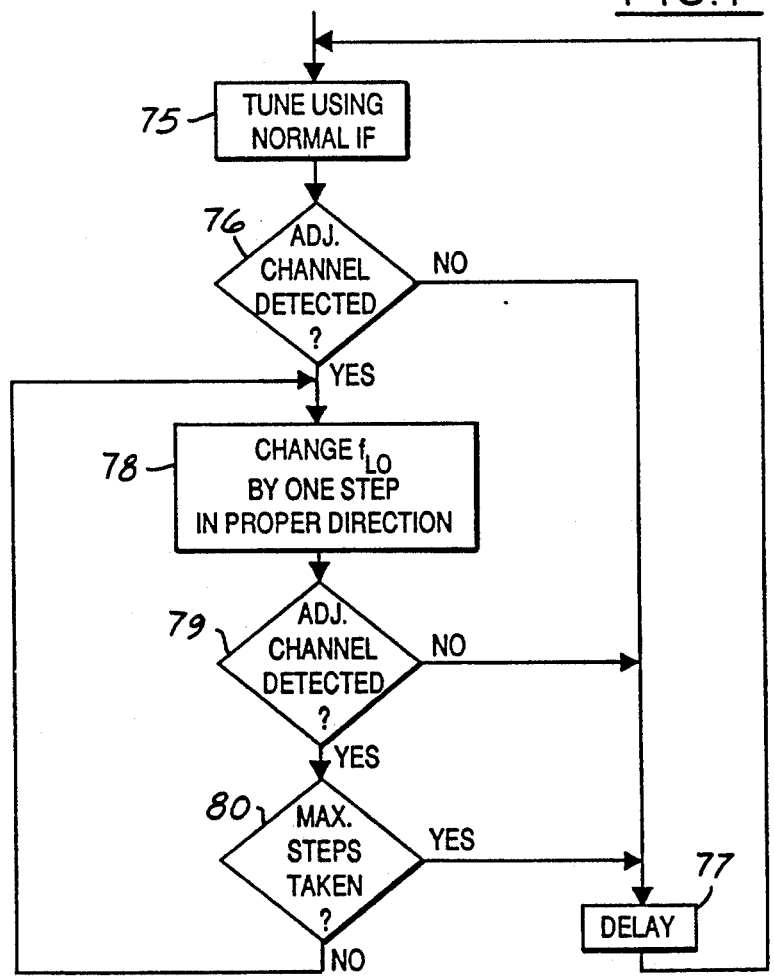
FIG. 7 is a flowchart illustrating the detection and reduction of adjacent channel interference.

A preferred method for Practicing the present invention is shown in FIG. 7. In step 75, the receiver tunes to a desired broadcast signal using the normal mixing signal frequencies to obtain normal intermediate frequency signals. In step 76, an upper or a lower adjacent channel signal is detected as previously described. If no adjacent channel signal is detected or if an adjacent channel signal is detected but the remaining adjacent channel is not clear, then a delay is performed in step 77 and the method is restarted at step 75 after the delay. A delay of several minutes is preferred since adjacent channel signals do not change rapidly even in a mobile radio such as in an automobile.

In the event that an adjacent channel is detected and a clear channel is available for shifting the received signals, then the frequency of the mixing signal $f_{LO}$ is changed in step 78. The proper direction for changing the mixing frequency depends on the relationship between the intermediate frequencies and the mixing signals as previously described.

In the preferred method of the present invention, the mixing signal is changed in discrete frequency steps so that the received signals are shifted in frequency only enough to eliminate the adjacent channel interference. As a result, modulation distortion and phase distortion are kept to a minimum.

A check is made in step 79 to determine whether an objectionable adjacent channel is still being detected. If not, then the delay of step 77 is executed and the procedure starts over. If adjacent channel interference is still detected, then a check is made in step 80 to determine whether the maximum number of steps in one direction have been taken in changing the mixing frequency. If the maximum steps have been taken (such that it is not desirable to further shift the received signals), the delay in step 77 is implemented. If the maximum number of steps have not been taken, then a return is made to step 78 and the mixing signal is changed by an additional step.

In a preferred embodiment of the present invention, the step size change in mixing frequency is about 10 kHz or greater, preferably about 20 kHz. A step size as small as 5 kHz is less desirable since the effect of a 5 kHz frequency shift would be small. The maximum frequency shift of the desired signal is preferably about 40 kHz in either direction away from the intermediate frequency since greater frequency shifts result in an undesirable amount of phase distortion. Thus, using the preferred step size of 20 kHz and the maximum frequency shift of 40 kHz, the maximum number of steps that may be taken in the method of FIG. 7 is two.

While preferred embodiments of the invention have been shown and described herein, it will be understood that such embodiments are Provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. An adjacent channel detector for a radio broadcast receiver comprising:
   tri-band filter means for receiving radio broadcast signals and for tri-band filtering said radio broadcast signals to derive a lower channel signal, a desired channel signal, and an upper channel signal;
   tri-band level detecting means coupled to said tri-band filter means for level detecting said lower channel signal, said desired channel signal, and said upper channel signal to produce a lower channel level, a desired channel level, and an upper channel level, respectively; and
   comparator means coupled to said tri-band level detecting means for generating a first detection signal when the ratio of said upper channel level to said desired channel level is greater than a first predetermined proportion and the ratio of said lower channel level to said desired channel level is less than a second predetermined proportion, and for generating a second detection signal when the ratio of said lower channel level to said desired channel level is greater than said first predetermined proportion and the ratio of said upper channel level to said desired channel level is less than said second predetermined proportion.

2. The detector of claim 1 wherein said first predetermined proportion is about +30 dB.

3. The detector of claim 1 wherein said second predetermined proportion is about −30 dB.

4. The detector of claim 1 wherein said lower channel signal and said upper channel signal have a bandwidth less than the bandwidth of said desired channel signal.

5. The detector of claim 4 wherein said lower channel signal includes substantially the highest frequencies within the lower channel and wherein said upper channel signal includes substantially the lowest frequencies within the upper channel.

6. Mixer apparatus for a radio broadcast receiver comprising:
   a local oscillator generating an alternating output signal having a frequency responsive to a control signal;
   mixer means coupled to said local oscillator for mixing a radio broadcast signal with said alternating output signal to produce an intermediate frequency signal including a desired signal, an upper adjacent-channel signal, and a lower adjacent-channel signal;
   adjacent channel detector means coupled to said mixer means for generating a first detection signal when the ratio of the strength of said upper adjacent-channel signal to the strength of said desired signal is greater than a first predetermined ratio and the ratio of the strength of said lower adjacent-channel signal to said strength of said desired signal is less than a second predetermined ratio, and for generating a second detection signal when the ratio of the strength of said lower adjacent-channel signal to said strength of said desired signal is greater than said first predetermined ratio and the ratio of the strength of said upper adjacent-channel signal to said strength of said desired signal is less than said second predetermined ratio; and
   controller means coupled to said adjacent channel detector means and to said local oscillator for generating said control signal so that said alternating output signal is produced at a predetermined frequency when both said first detection signal and said second detection signal are absent, so that the frequency of said alternating output signal is decreased in response to said first detection signal, and so that the frequency of said alternating output signal is increased in response to said second detection signal.

7. The apparatus of claim 6 wherein said controller means provides limits for the deviation of the frequency of said alternating output signal from said predetermined frequency to limit phase distortion caused by changing said frequency.

8. The apparatus of claim 6 wherein said controller means shifts said frequency in predetermined steps until either said detection signals are both absent or said frequency has been shifted by a predetermined maximum limit.

9. The apparatus of claim 8 wherein said predetermined steps have a step size in the range of about 10 kHz and higher.

10. The apparatus of claim 8 wherein said predetermined steps have a step size of about 20 kHz.

11. The apparatus of claim 6 wherein the maximum that said frequency of said alternating output signal is shifted from said predetermined frequency is about 40 kHz.

12. Radio receiver apparatus comprising:
   amplifier means for amplifying received radio signals;
   a local oscillator generating an alternating output signal having a frequency responsive to a control signal;
   mixer means coupled to said amplifier means and said local oscillator for mixing said amplified radio signals and said alternating output signal to derive IF signals;
   tri-band filter means coupled to said mixer means for tri-band filtering said IF signals to derive a lower channel signal, a desired channel signal, and an upper channel signal;
   tri-band level detecting means coupled to said tri-band filter means for level detecting said tri-band filtered IF signals to produce a lower channel level, a desired channel level, and an upper channel level;
   ratio means coupled to said tri-band level detecting means for generating a first ratio corresponding to a relatively strong adjacent-channel signal and for generating a second ratio corresponding to a relatively weak adjacent-channel signal;
   comparator means coupled to said tri-band level detecting means and to said ratio means for generating a first detection signal when the ratio of said upper channel level to said desired channel level is greater than said first ratio and the ratio of said lower channel level to said desired channel level is less than said second ratio, and for generating a second detection signal when the ratio of said lower channel level to said desired channel level is greater than said first ratio and the ratio of said upper channel level to said desired channel level is less than said second ratio; and controller means coupled to said comparator means and said local oscillator for generating said control signal so that said alternating output signal is produced at a predetermined frequency in the absence of both said first detection signal and said second detection signal, so that the frequency of said alternating output signal is decreased in response to said first detection signal, and so that the frequency of said alternating output signal is increased in response to said second detection signal.

13. A method of detecting the presence of an adjacent channel in a radio broadcast receiver comprising the steps of:

tri-band filtering received radio broadcast signals to derive a lower channel signal, a desired channel signal, and an upper channel signal;

level detecting said tri-band filtered signals to produce a lower channel level a desired channel level, and an upper channel level;

comparing said upper channel level and said desired channel level;

comparing said lower channel level and said desired channel level;

generating a first detection signal when the ratio of said upper channel level to said desired channel level is greater than a first ratio and the ratio of said lower channel level to said desired channel level is less than a second ratio to indicate the presence of an upper adjacent channel; and generating a second detection signal when the ratio of said lower channel level to said desired channel level is greater than said first ratio and the ratio of said upper channel level to said desired channel level is less than said second ratio to indicate the presence of a lower adjacent channel.

14. The method of claim 13 wherein said lower channel signal and said upper channel signal have a bandwidth less than the bandwidth of said desired channel signal.

15. The method of claim 14 wherein said lower channel signal includes substantially the highest frequencies within the lower channel and wherein said upper channel signal includes substantially the lowest frequencies within the upper channel.

16. A method for reducing adjacent channel distortion in a radio receiver comprising the steps of:

generating an oscillator signal;

mixing a radio signal with said oscillator signal to produce an intermediate frequency signal including a desired signal, an upper adjacent-channel signal, and a lower adjacent-channel signal;

generating a first detection signal when a first predetermined fraction of the level of said upper adjacent-channel signal is greater than the level of said desired signal and the level of said lower adjacent-channel signal is less than a second predetermined fraction of the level of said desired signal;

generating a second detection signal when said first predetermined fraction of the level of said lower adjacent-channel signal is greater than said level of said desired signal and the level of said upper adjacent-channel signal is less than said second predetermined fraction of said level of said desired signal;

controlling the frequency of said oscillator signal to a predetermined frequency when both said first detection signal and said second detection signal are absent;

shifting the frequency of said oscillator signal from said predetermined frequency in response to said first detection signal to reduce adjacent channel distortion; and shifting the frequency of said oscillator signal from said predetermined frequency in response to said second detection signal to reduce adjacent channel distortion.

* * * * *